United States Patent
Kisters

(10) Patent No.: US 10,305,896 B2
(45) Date of Patent: May 28, 2019

(54) AUTHENTICATION SYSTEM

(71) Applicant: Friedrich Kisters, Kreuzlingen (CH)

(72) Inventor: Friedrich Kisters, Kreuzlingen (CH)

( * ) Notice: Subject to any disclaimer, the term of this patent is extended or adjusted under 35 U.S.C. 154(b) by 220 days.

(21) Appl. No.: 15/129,793

(22) PCT Filed: Mar. 18, 2015

(86) PCT No.: PCT/EP2015/055626
§ 371 (c)(1),
(2) Date: Sep. 27, 2016

(87) PCT Pub. No.: WO2015/144511
PCT Pub. Date: Oct. 1, 2015

(65) Prior Publication Data
US 2017/0163638 A1 Jun. 8, 2017

(30) Foreign Application Priority Data

Mar. 27, 2014 (DE) .................... 10 2014 004 349

(51) Int. Cl.
*H04L 29/06* (2006.01)
*G06K 19/06* (2006.01)
(Continued)

(52) U.S. Cl.
CPC .......... *H04L 63/0861* (2013.01); *G06F 21/32* (2013.01); *G06K 19/041* (2013.01); *G06K 19/06* (2013.01)

(58) Field of Classification Search
CPC ...... G06K 19/06; G06K 19/041; G06F 21/32; H04L 63/0861
(Continued)

(56) References Cited

U.S. PATENT DOCUMENTS 5,568,251 A  10/1996 Davies et al.
5,697,649 A  12/1997 Dames et al.
(Continued)

FOREIGN PATENT DOCUMENTS

DE          10304805 A1    8/2004
DE     102004049139 A1    4/2005
(Continued)

OTHER PUBLICATIONS

International Search Report of International Application No. PCT/EP2015/055626 dated May 28, 2015.
(Continued)

*Primary Examiner* — Brandon S Hoffman
*Assistant Examiner* — Nega Woldemariam
(74) *Attorney, Agent, or Firm* — Roberts Mlotkowski Safran Cole & Calderon, P.C.

(57) ABSTRACT

The invention relates to an authentication system, comprising a security element (1) having a changing or changeable surface (6), structure, volume, composition, or sequence of characters, an assignment means, which assigns the security element (1) to a person, an object, a medium, or a group of these, a local or central memory device for storing security feature, an interrogator for retrieving a current visual appearance of the security feature, a data synchronization means for comparing the retrieved visual appearance with the visual appearance of the security element (1) stored in the local or central memory device, wherein an inherent or external trigger means is present, which effects a change at least in some areas of a surface (6), structure or characteristic of the security element (1), such that a dynamically changed security element (1) is produced which is available as the current visual appearance for a query by the interrogator.

15 Claims, 8 Drawing Sheets

(51) Int. Cl.
*G06F 21/32* (2013.01)
*G06K 19/04* (2006.01)

(58) Field of Classification Search
USPC .............................................................. 726/7
See application file for complete search history.

(56) References Cited

U.S. PATENT DOCUMENTS

| | | | |
|---|---|---|---|
| 5,719,948 | A | 2/1998 | Liang |
| 6,331,569 | B1 | 12/2001 | Kisters et al. |
| 6,701,615 | B2 | 3/2004 | Harding et al. |
| 8,020,776 | B2 | 9/2011 | Tompkin et al. |
| 2003/0167616 | A1 | 9/2003 | Harding et al. |
| 2004/0107367 | A1 | 6/2004 | Kisters |
| 2004/0229022 | A1 | 11/2004 | Bourdelais et al. |
| 2006/0131518 | A1 | 6/2006 | Ross et al. |
| 2007/0087173 | A1 | 4/2007 | Endres et al. |
| 2011/0060920 | A1 | 3/2011 | Kisters |
| 2011/0107405 | A1 | 5/2011 | Kisters |
| 2011/0247058 | A1 | 10/2011 | Kisters |
| 2012/0175866 | A1 | 7/2012 | Kisters |
| 2013/0067547 | A1* | 3/2013 | Thavasi .................. G06F 21/31 726/7 |
| 2014/0231511 | A1 | 8/2014 | Kisters |

FOREIGN PATENT DOCUMENTS

| | | |
|---|---|---|
| DE | 102006006323 A1 | 8/2007 |
| DE | 10 2008 050 768 B3 | 11/2009 |
| DE | 102009033221 A1 | 1/2011 |
| DE | 102009039190 A1 | 3/2011 |
| DE | 10 2010 009 977 A1 | 9/2011 |
| DE | 10 2011 055 297 B4 | 5/2013 |
| EP | 1158459 A1 | 11/2001 |
| GB | 2265482 A | 9/1993 |
| WO | 9724699 A1 | 7/1997 |
| WO | 9857299 A1 | 12/1998 |
| WO | 0143086 A1 | 6/2001 |
| WO | 03081522 A2 | 10/2003 |
| WO | 2005025891 A2 | 3/2005 |
| WO | 2005048182 A1 | 5/2005 |
| WO | 2011/006640 A1 | 1/2011 |
| WO | 2012038842 A1 | 3/2012 |
| WO | 2013/191913 A1 | 12/2013 |

OTHER PUBLICATIONS

English translation of the International Search Report and Written Opinion of the International Searching Authority issued in International Application No. PCT/EP2015/055624, dated Jun. 12, 2015.

English translation of the Written Opinion of the International Searching Authority issued in International Application No. PCT/EP2015/055626, dated May 28, 2015.

English translation of the International Search Report and Written Opinion of the International Searching Authority issued in International Application No. PCT/EP2015/062227, dated Aug. 7, 2015.

\* cited by examiner

AUTHENTICATION SYSTEM

TECHNICAL FIELD

The present invention relates to an authentication system for authentication and/or identification of persons, objects, service systems or data-based media, such as data storage or computer programs, in which one, not changing, static security feature characteristic for the person, for the object, for the service system or for the data-based media, is either newly created or an existing one is used, which is then changed by the addition of non-determinable factors and is thus changed into a dynamic security feature.

STATE OF THE ART

Many of the known authentication devices are based on rigid security features, for example where a PIN number, a biometric feature (e.g., fingerprint), a code or a password is assigned to a specific user. For service systems, access restrictions to specific user groups are the rule and require extensive security measures to protect the related sensitive data of the participants.

Usually authentication devices are based on a previous registration, in which the identity of a user is stored before the first access to the application by entering user data. In the prior art, different authentication methods are distinguished, whereby the factors include the knowledge (e.g., password), the ownership (e.g., an access card) and personal features of the user (e.g., fingerprint, signature).

Further developments of these technologies foresee, for example, that small portable devices generate valid passwords via an algorithm and an authentication-server at the same time and display it on a display. These passwords contain mostly longer series of numbers that must be entered correctly. However, many of these processes can be easily tampered with or bypassed. Password-based authentication systems are extremely safety-prone because data transmissions can be intercepted and thus hacked.

Methods involving a biometric detection of features of the user, such as a fingerprint or an iris scan of the user works not always reliable and are not secure to potential attackers because the biometric data do not change and therefore can be copied.

An example of the transfer of security features in a network system is described in DE 10 2011 055 297 B4. In this case, the security features are stored in an autonomous authentication device separately from the application server. A disadvantage of the method, however, is that this is inflexible security features that can be copied.

Another way is pursued in WO 2013/191913 A1. which describes a three-dimensional code having a structure or a profile in X, Y and Z directions. In the structure information is encoded. Here are different parameters of the structures, such as the height, the width, or the depth and the shape of the elements are used to encode information. The codes contained therein may also contain more information, for example, conventional codes such as bar codes or QR codes. Again, the structure, even if two-dimensional, is given and does not change. A change in the structure would inevitably cause a deletion or alteration of the information encoded therein and would be undesirable. So these 3-D structures can be very easily circumvented by a attacker.

DE 10 2010 009 977 A1 describes a security element for security papers, value documents and other data medias, with a colour layer with magnetically aligned magnetic pigments that form a motif in the form of patterns, characters or a code that shows a dynamic motion effect upon tilting of the security element. According to this variant, for a generic security element is the first dynamic motif of the magnetically aligned magnetic pigments combined with a second, static motif, generated by the action of laser radiation, in the form of patterns, characters or a code, whose fixed outline forms a fixed reference point for the dynamic design motif.

Aside, safety elements are known, in which surface structures or material structures that form part of a security element, an object or a person, can be utilized. In WO 2011/006640, e.g., topographic structures are used in the form of crackle as a security feature.

EP 1 158 459 A1 is described a method for authentication of objects, in which a substance is provided for generating a security feature and is assigned to an object. The visual appearance of the substance is acquired at a first time-point and stored in a storage medium. For authentication, the visual appearance of the substance is compared with the visual appearance stored in the memory. Then the visual appearance of the substance is actively changed, for example, by irradiation with IR- or UV light, so that the resulting structure property (a time-varying luminescence) is unpredictable. At a further point in time, the visual appearance of the substance is captured again and the current visual appearance as obtained is compared with the one stored in the device. The object is then authenticated positively if the substance has at least partly changed in visual appearance vis-a-vis the one stored in the memory device between the two time-points. Thus, in the method, waveforms of the measured time-dependent luminescence as an authenticating feature are compared, whereby a point-to-point comparison of the light decay curve is carried out with the reference curve stored in the memory device.

DE 10 2008 050 768 B3 describes a security feature, based on luminescence-emitting materials as well as a method, whereby the security feature is formed by the first luminescence-emitting materials plus the second luminescence-emitting materials. The first luminescence is broadband while the second luminescence is narrowband. The visual colour impression of the security feature and the overall intensity of the luminescence are determined, according to the invention, by the first luminescence that is spectrally broadband, upon excitation of the luminescence-emitting materials.

DESCRIPTION OF THE INVENTION

Against this background, it is an object of the present invention to provide an improved authentication system, in which the secure requirement while carrying out an authentication of a person, an object, a service provisioning system or a data-based medium is further increased and prevents unauthorized access. This object is achieved by an authentication system having the features of claim 1.

The authentication system according to the invention comprises a security element with dynamically changing or variable security features associated with a particular person, an object or medium. The security element consists of a changing or variable surface, structure, composition, volume, or string, which is detectable by a scanning device and transmittable by a communication device to an evaluator. The surface, the structure, the volume or the composition can be arbitrary, and part of an object, a medium or a material (for example, a polymer plastic or resin). It is characteristic that the object has a surface, an inner or outer structure, a volume or a material composition, which provides a specific visual appearance for a scanner. Suitable for this purpose are the structures or profiles. However, the chemical composition of a mixture of substances, for example, a mixture with coloured pigments can be used as a dynamically changing security feature. The inventive security element is assigned to a particular person, an object, a medium or a group of these via an assigning means. The assigning means may be, for example, a table of a database. In a preferred variant, it can be foreseen that the digital appearance of the security element of the inventive authentication device is stored on multiple, physically separate storage media, which further increases the safety. In addition, a local or central storage medium for depositing the security feature is provided.

As storage medium is suitable, every analogue or digital storage medium (e.g., magnetic media, flash memory) by which the security feature or a visual appearance thereof (e.g., scan, photo, graphics) can be stored. Preferably, the security feature is stored in digital form in the local or central storage medium.

A local storage medium can be found, for example in a mobile communication device, such as mobile phone. A central storage medium is, for example, part of a server environment with a service provider. The authentication system further comprises a retrieval means for retrieving a current visual appearance of the security feature. The visual appearance, for example, (a camera unit) is generated via a scanner or an optical detection unit. A data comparison means serves to compare the retrieved visual appearance with the visual appearance of the security element stored in the local or central storage medium. The visual appearance is preferably a graphical representation, a photograph or a digital appearance of the security feature. Preferably, the data synchronization is carried out digitally.

The change of the security feature is triggered via an inherent or external trigger means, which is part of the inventive authentication system. An inherent trigger means impacts a change in the security feature without any external influence, for example, by a chemical or physical reaction which is caused by a feature of a substance, a composition or a specific material. An inherent trigger means is, for example, a chemical component in a composition that causes a colour change in a corresponding material composition. Further, physical trigger means are included, which act directly on an object or a material having a dynamically variable surface, structure, volume, or composition. As soon as the surface, the structure, the volume or the composition of a security element changes, it is usually also measurable via a measuring means and making it thus suitable as a dynamic security feature according to the present invention. An external trigger means acts from outside on the security feature, and leads to its change. The change may take place in or at the surface, the structure, the volume, the composition or in a feature of the security element. Preferably, the change is dynamic, i.e., the security element or its visual appearance changes over time continuously or sporadically in the case of a query request.

The change of the security element can be visually perceptible or invisible to the human eye. In certain embodiments, the change of the surface, the structure, the volume or the composition can be ascertained only via appropriate physical or chemical measuring devices. So long as a visual appearance is captured by this safety element and is stored with the help of storage means, it can serve the inventive authentication system. In a further embodiment, it may be foreseen that the security element or its visual appearance changes only when a query is performed by the interrogator.

Preferably, the current visual appearance in digital form is available for query by the interrogator.

The trigger means is preferably a physical, chemical or digital parameter. Examples of such parameters are temperature, air pressure, humidity, the colour change of a colouring agent, or parameters, such as friction or movement. Preferably, it relates to the trigger means about the charge state of an energy source, a GPS position, an electrical voltage, a data sequence, a measurable physical quantity of the ambient atmosphere, a certain behavioural pattern of a person or the implementation of a financial transaction via a means of payment (e.g., a credit card). Thus, in the last-mentioned variant it can be foreseen that for a financial transaction the trigger means is activated, and subsequently a digital change in the stored security element in the storage medium is carried out. This can be done, for example by recalculating, changing or transforming of a digital security information. However, the trigger means can also act directly on the security element, for example, by applying a force and an associated deformation of the body or a part thereof.

The term "medium" in context of the present invention should be considered broadly and comprises any desired item to be authenticated, including devices, systems, data and media, computer programs, apparatuses and services. Preferably, it relates to a mobile communication device or a computer unit. Furthermore, the authentication system is suitable for the authentication of a service provisioning system, for instance a financial payment system, an ordering system or any other service of a service provider. Finally, with the authentication system a software (for example, an app on a Smartphone) or data can be authenticated. Aside, character strings such as codes in the authentication system for authentication can be applied. This can be optionally encrypted, wherein the encryption itself can also be effected dynamically.

In a first embodiment, the security element consists of static, not variable security features and dynamically changeable security features. The dynamic secure features change their profile, structure, composition, volume, or the visual appearance when a trigger means reaches a new or other physical or chemical value. Preferably, the value for the activation of the manipulation of the security element or its visual appearance is previously set and stored in a central database. For example, it may be provided that the visual appearance of the security element changes digitally, depending upon the state of charge of an accumulator or a battery.

In a preferred variant, the security element consists of a stretchable material, in which dynamic security features such as cracks, fissures or recesses are formed, whose diameter or profile changes according to the elongation, shrinkage or deflection of the material. Thus, at a first time point, a first recording of the visual appearance of such a dynamic material (e.g., a folding band) can be made, wherein the individual cracks and fissures exhibit a small diameter. Partly, the cracks and fissures have not yet formed and are difficult to detect. If the folding band is now pulled or stretched apart, then the corresponding diameter of the cracks and fissures enlarge, whereby the overall impression of the material changes significantly. If, during a second time point again, a recording of this visual appearance is made, then the result is a dynamically altered visual appearance, which corresponds to the dynamically changing security feature.

For authentication, it is provided that the visual appearance of the first time point has changed at least partially compared to the visual appearance of the second time point.

Should the two time points be placed too close together, then a second authentication can be carried out via an alternative authentication (e.g., by entering a PIN code or a biometric feature). In a preferred variant, an active modification of the security element or its visual appearance is requested when, for example, a mechanical manipulation of the security element is done. The mechanical manipulation can be done by force, which is triggered, for example, by movement.

In a further embodiment the security element has a first surface with spikes or sharp edges, which engage during movement about a rotation axis, formed at the security element in an adjacent second surface and change their structure. The spikes or sharp edges of one surface cut in the material of the second surface. Therefore, the material of the sharp edges or spikes is preferably harder than the material of the second adjacent surface, so that the changes in the structure are scannable for the scanning device. The visibility of the structure can be seen with naked eye or by a special scanning device (for example, an infrared device).

Preferably, for the security element, a first surface with its integral static security features and a second surface with its integral dynamic security features are provided. The change of the dynamic part is achieved from the fact that below the first surface of the security element a rigid base and below the second surface of the security element a flexible base are configured. During activation by the trigger means the flexible base changes the overlying dynamic security features. Again, there are different visual appearances in the case of two query time points.

In a further variant, a first surface with integrated static security features and a second surface with integrated dynamic security features are provided in the security element, whereby the first surface is coated with a protective layer and the second surface is coated with an activation layer. The protective layer prevents that the security features of the static part changes, whereas the activation layer causes a change of the security features of the dynamic part.

In a further variant, the security element consists of a material, in which deformable and/or movable voids and/or particulate body are located. The geometric profile, the stretch covered by movement, the direction of rotation, the position and/or the digitally or optically recorded visual appearance of the voids and/or the particulate body are alterable after activation of the trigger means. Preferably, the particles are arranged in a body and can be changed or moved by a force. Such forces comprise, for example, magnetic forces, gravitational forces or centrifugal forces that are caused by movement. Preferably, in particulate bodies, it relates to magnetisable particles, which are arranged in a material or a composition. The movement, the rotation and the distance travelled can, for example, be changed via magnetic force. By the rearrangement of the particles and/or the voids, the visual appearance changes, so that the dynamic security feature between the two time points, namely before and after activation, is present in a modified version.

In a further variant, the security element comprises one or more surfaces within a three-dimensional structure. In the structure, it may be a labyrinth or a three-dimensional code, where other information is stored. The rigid structure of the code serves for storing the information, while the changing dynamic structure is used as a security element. Thus, it is sufficient if only a part of the 3-D code serves for authentication.

In a further variant the security element can include an arrangement of several characters, whose position, rotation, size, shape, volume and/or colour can be/are changed by the trigger means. Even in such an embodiment, the visual appearance changes between two time points. The authentication system according to the invention is particularly suited for use in complex structures, such as in the structures of a 3-D code. A 3-D code encodes information in three different directions. Thus, individual areas of the 3-D codes can be reserved as dynamic security feature. In this way, the 3-D code can be identified via the authentication device. Thus, individual areas of the structure or profile sectors of 3-D codes can be changed dynamically via the trigger means. The change can be done either directly on the 3-D code itself or by an image of the 3-D codes, which is present, for example, in digital form. In this case, the trigger means would cause a change in the digital 3-D code. The scanner detects the areas that at least partially contain dynamic security features. The data comparison means (for example, a software-based application) compares the sampled security feature or portions thereof with the visual appearance of the security feature stored in the memory device. Specific areas of the security feature have evolved as expected, and thus, there is a positive authentication.

The change in the dynamic security features may be either random or programmed. To increase security, the trigger means in itself is dynamic, i.e. it changes in a way that is not easily determined or predictable. If the trigger means is a physical parameter, then it can be determined before that an action, i.e., a change in the dynamic security features of the security element, occurs only when certain conditions or parameters are present. These conditions may be, for example, the duration or amplitude of a pulse, which is detected by sensors and transmitted to a corresponding activation device. The activation means causes ultimately the physical change of the dynamic security features respectively their visual appearance.

The authentication system according to the invention can thus be described by using differently set-up security elements. The selection shown here represents only a few examples that show how the said security element can be set up. In contrast to a rigid security feature (e.g., the storing of fingerprint), the dynamic change of the security features enhances security considerably, since the type and manner of change is not comprehensible or foreseeable by a forger or an unauthorized person. The last stored visual appearance of the security element in the authentication device and the contingent manipulation of security features, caused by a trigger means, cannot be unlocked by a forger.

BRIEF DESCRIPTION OF THE DRAWINGS

The invention is further illustrated in the following drawings.

WAYS OF CARRYING OUT THE INVENTION AND INDUSTRIAL APPLICABILITY

Figure 1:
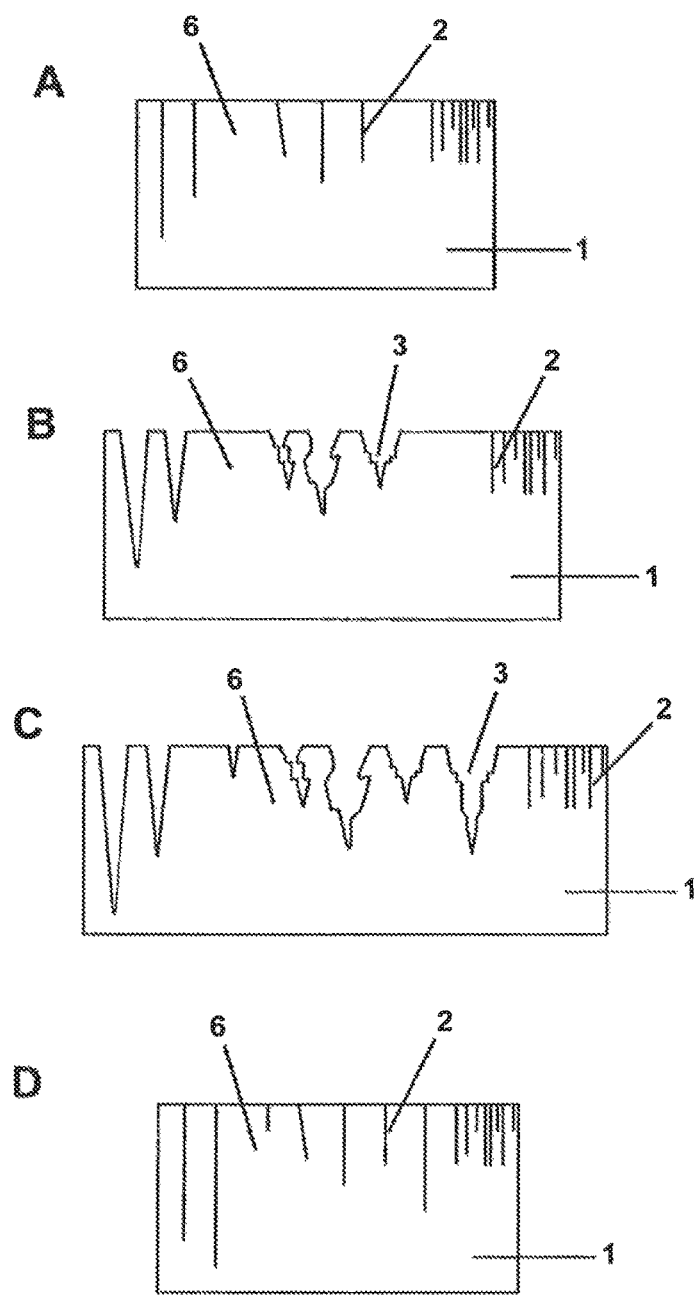
In FIGS. 1 to 7 are shown different security elements which are part of the said authentication system. These security elements exhibit dynamic, but also partly rigid security features that can be affected by an inherent or external trigger means and altered. Thus, at least partially mechanical changes of a surface, a structure, or a property of the security element happen. By the modification, a dynamically altered security element arises, which is available as the current visual appearance for a query by the interrogator. Digital visual appearances of these security elements are stored in storage medium, for example, as part of a database. An interrogator retrieves the current visual appearance of the security feature, and a data comparison means compares the retrieved visual appearance with the visual appearance of the security element stored in the local or central storage medium.

FIG. 1 shows an example of a security element 1 of the inventive authentication system. It consists of a material having a surface 6, in which cracks, fissures or recesses 2 are present. The greater the material being stretched or pulled apart, the bigger the cracks or recesses 2. FIG. 1A shows the closed state. This state is stored at a first query time as a digital identity for a security feature 1 in the storage medium. FIG. 1B shows a light opening state, in which the structures and profiles, i.e., dynamically variable security features 3, are clearly visible. If the material (for example, a polymer tape) is elongated, stretched or opened in other ways (e.g., bent), then the physical parameters, in particular the diameter and the opening angle of the individual fissures, cracks and recesses 2 change. It is also apparent that the basic character of the individual cracks, fissures and recesses 2, i.e., the outer visual appearance, remains related. One compare in particular FIG. 1C with FIG. 1D. In the next open state of the material as per FIG. 1C further cracks, fissures and recesses 2 of the dynamically variable security feature 3 are added. Now, if the database is updated with the changed dynamic states of the security element 1, then the security feature 1 must emerge from the previously stored security feature 1. The material must either be further opened or closed again. In FIG. 1D, in turn, is shown the closed state in which, however, individual cracks 2 are added as additional dynamic safety features 3. On the far right side of the security feature 1 shown in FIGS. 1 A to 1D, there is an optional static area, which marks the security feature 1, without having to change the feature itself.

Figure 2:
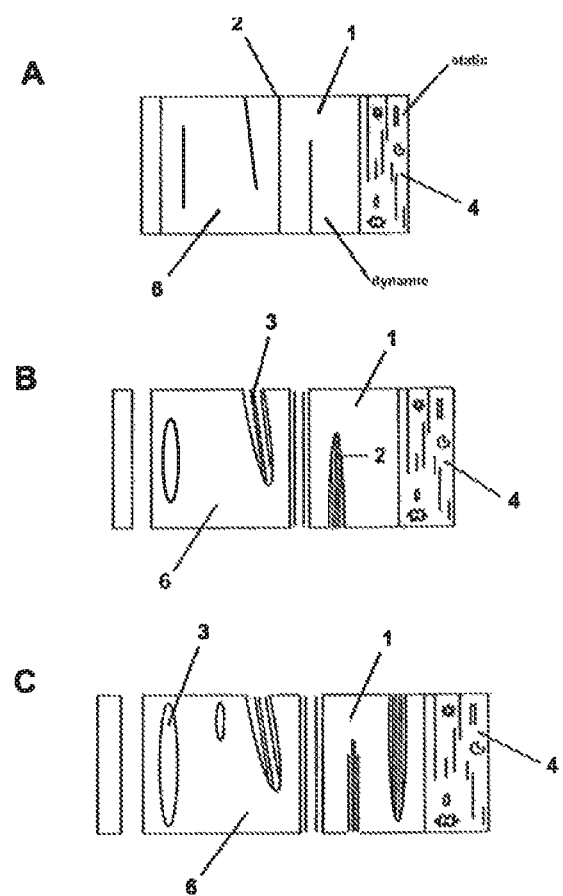

FIG. 2 shows the plan view of a security element 1 of the authentication device according to the invention, which is shown in FIG. 1. The inventive authentication system enables scanning of different sides of a security element. While FIG. 1 shows a side view of a security element, a plan view is shown in FIG. 2, which has a different visual appearance. In this way, different views can make use of the same security element for one or more authentication processes. In the right half of the figure, an example is shown, wherein rigid geometric elements are incorporated in the material (see FIG. 2A, right side). If the material is stretched, i.e. is opened, then individual structures, cracks or recesses 2, and thus the surface 6 as dynamic security features 3 are visible in the material (FIG. 2B). In yet another opening these structures change, and other structures 2 are added (FIG. 2C). The examples in FIGS. 1 and 2 show that depending on the representation (cross-section or plan view) a security element 1 may be used for different dynamic changes. Thus, the cross-section of the security element 1 shows a different pattern as the same security element 1 in plan view. In addition, a static part is still defined as a non-changeable security element 4. These variations can be exploited. Further, the security element 1 is designable in the form of cubes or other geometric shape and readable from various sides; whereby the selection of sides (or parts thereof) and the appropriate security-related areas are carried out statically or dynamically. For example, individual faces of a geometric structure can exhibit different profiles or colour schemes that change unpredictably due to external or internal influences and are read.

Figure 3:
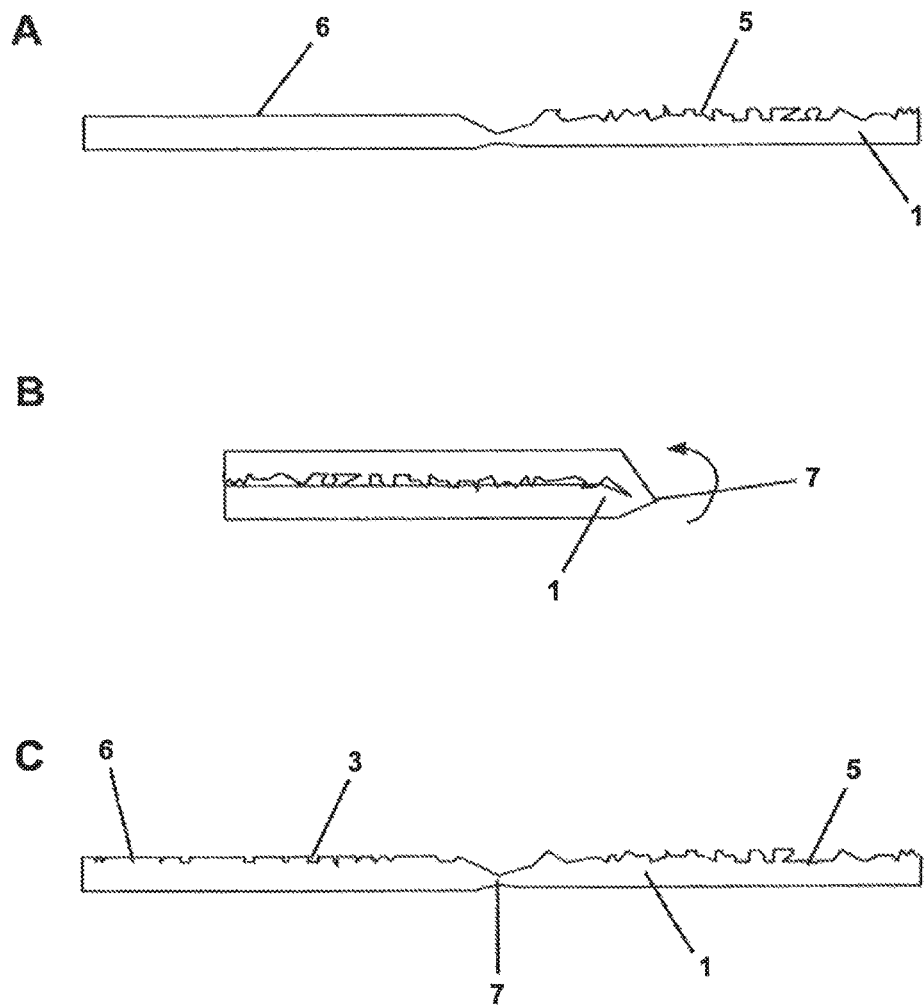

In FIG. 3 a further embodiment of the authentication system is shown. Here, it relates to a security element 1, in which two different surfaces 5, 6 are formed. The surface 6 on the left side characterizes at first the initial state, i.e., the surface is untreated. The right surface 6 of the security element 1 exhibit a structured surface with spikes and edges. To generate a dynamic security feature 3, the security element 1 is merged with the two halves. Through the mechanical merging of the two halves, the spikes and edges progress into the material of the untreated surface 6, whereby material imprints, friction points and pressure points arise (FIG. 3B). If the security element 1 with the two halves is opened again, then on the left half it can be seen, as to how the edges and spikes of the structured surface have been incorporated. In this way, a structured surface arises from an earlier rigid surface 5 that can change dynamically in the course of further development, wherein other mechanical impacts are carried out. This can, for example, be carried out, in which two surfaces 5, 6 can displace themselves or in which a further surface 6 is drawn with edges or spikes, which alter the dynamic surface with a mechanical closure.

Further, it is also possible that the dynamic half is changed, in which the edges or spikes of the structured surface, for example, are flattened, thereby changing the structure. Thus, both the left and the right half of the surface, provided that a dynamic change is present, can be used as a dynamic security feature 3.

Figure 4:
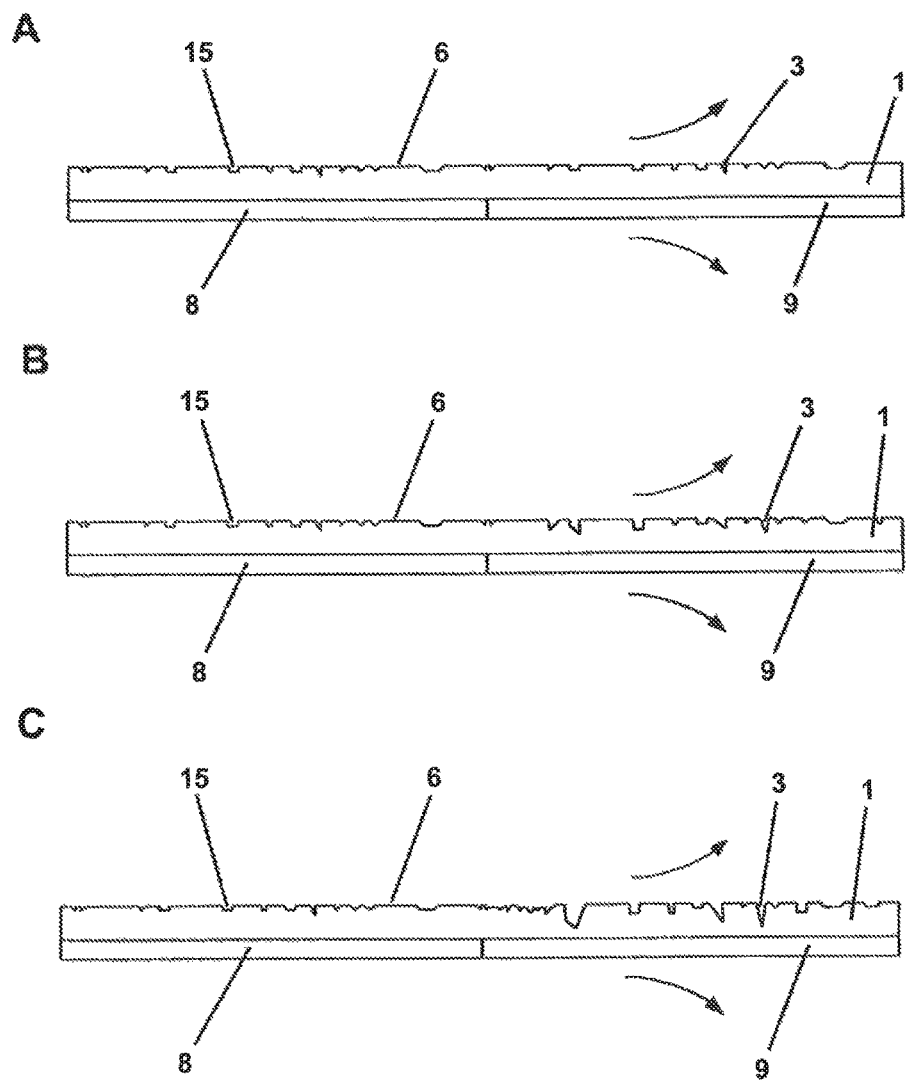

In FIG. 4 a security feature 1 with a rigid substrate 8 and a flexible substrate 9 is shown. While the rigid substrate 8 does not change the overlying surface 6, the flexible substrate 9 leads to a change of the structure of the surface above it. The flexible design of the right dynamic part of the security element is thus a continuous change of the structures formed on the surface, thereby providing a dynamic security feature 3. By the impact of the flexible substrate 9 on the overlying surface the therein formed structure is continuously changed or already formed structures are reinforced, which can be seen for instance by comparing the profiles of FIG. 4A, 4B and 4C.

Figure 5:
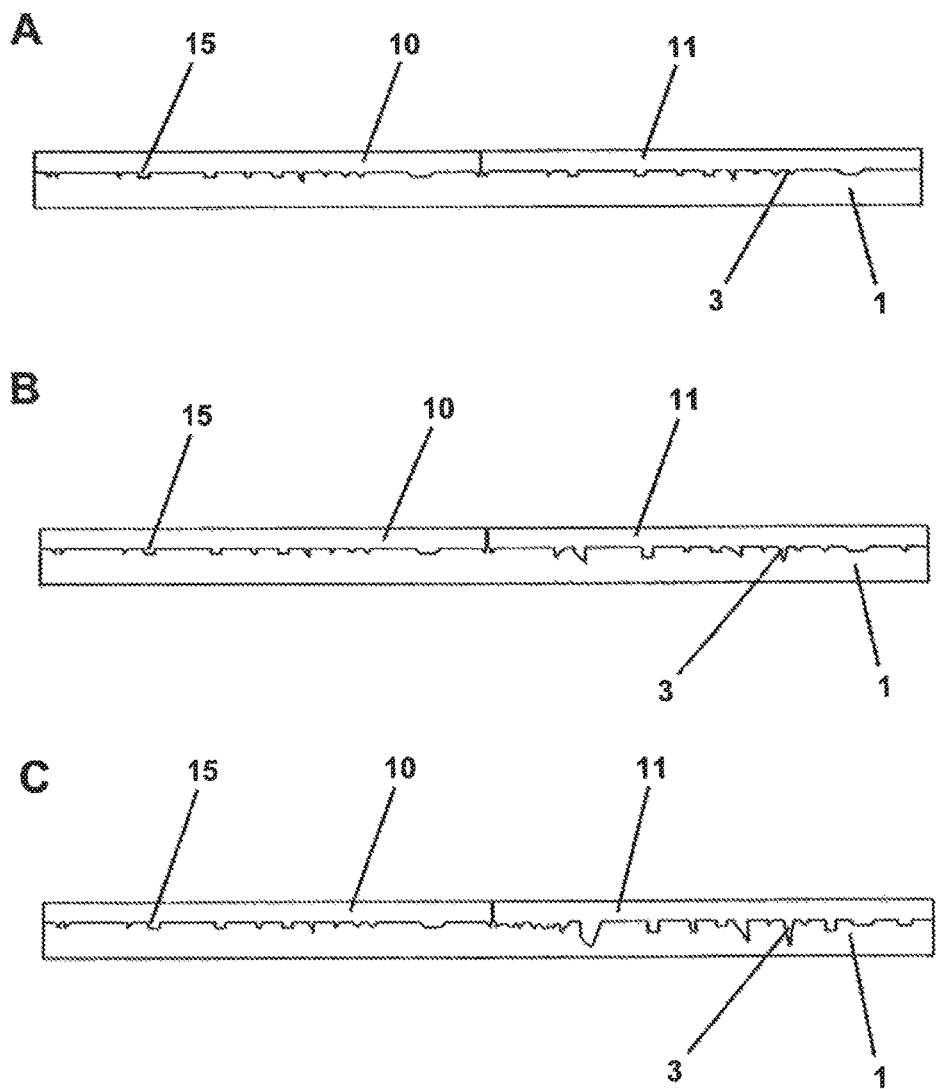

In FIG. 5 a further embodiment of a security element 1 for carrying out the inventive authentication system is shown. Again, a structured surface serves as a security feature. The surface of the rigid security feature is coated with a protective lacquer 10, which performs in a manner that the underlying structure 15 is not changed. The surface of the dynamic security feature 3 is coated with an activation lacquer 11, which changes the underlying structure, for example, by physical or chemical interactions. In FIG. 5A is shown the initial state. Protective lacquer 15 and activation lacquer 11 cover the underlying surface with the therein formed structures and profiles. In FIG. 5C activation lacquer 11 leads to a change of the underlying profile, while the surface coated with the protective lacquer 15 will remain unchanged. In FIG. 5C is shown a dynamic advancement, wherein the already formed structures in the dynamic security feature 3 (FIG. 5B) have evolved.

In a further variant (not shown here) it may be provided that advancement of the textured surface takes place only when the protective lacquer 10 is degraded or removed. In such a variant, the structure would remain intact as long as the protective coating 10 covers the structured surface. The dynamic development of the profiles and structures in the surface takes place only when the protective lacquer 10 is partially or completely removed. By applying a protective coating, this process can also be stopped.

Figure 6:
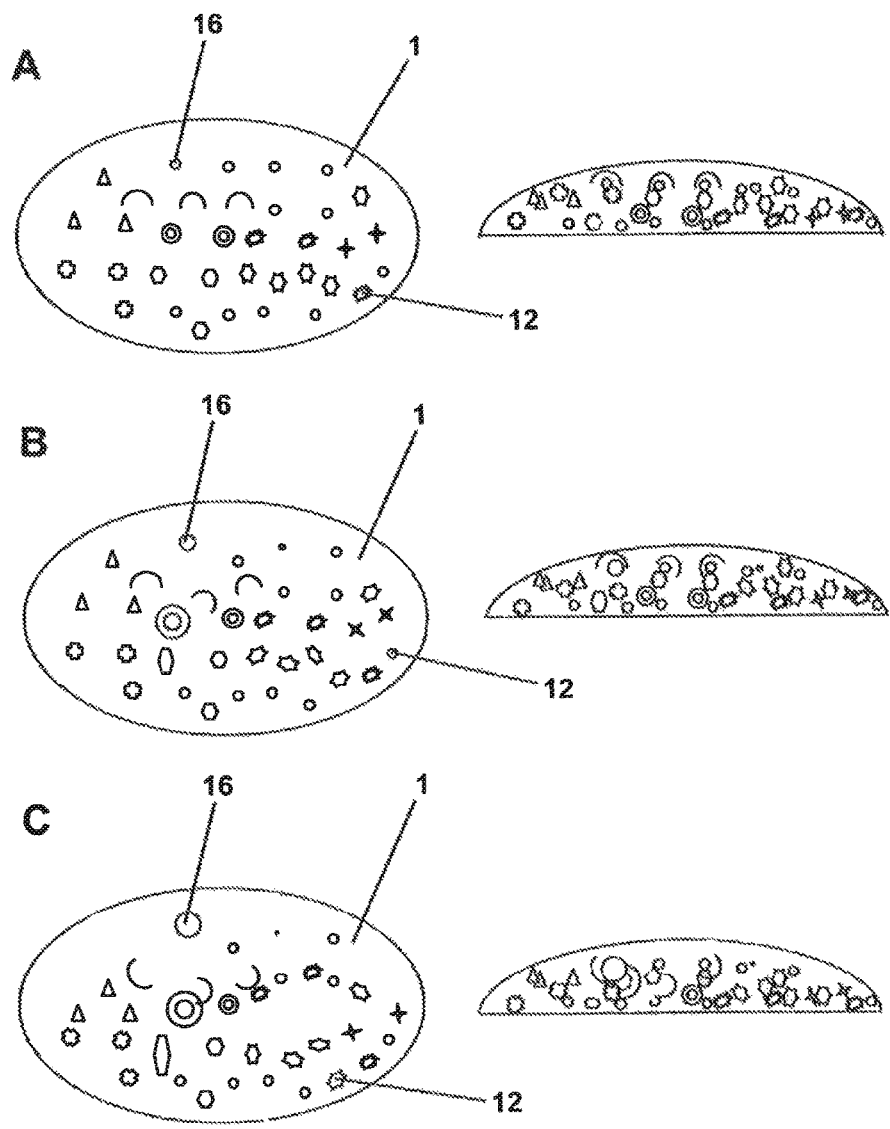

FIG. 6 shows a further variant, in which body and cavities with individual characteristics are present in a material or substance. The material in FIG. 6 includes cavities 16 and/or particles 12. The cavities can be formed, for example, by air pockets or gas. The particles 12 are preferably magnetic particles. The individual characteristics of the cavities 16 or particles 12 determine the patterns of the security element 1. The cavities 16 and/or particles 12 can change the form and position. Further, a rotation of the particles 12 is also conceivable. In FIG. 6A the initial state is shown. On the left side one can see the plan view, on the right side the cross section. Different geometries of particles 12 and cavities 16 are arranged in the material. FIG. 6B shows a dynamic state, in which the individual cavities 16 and particles 12 change, in particular the form, the direction of rotation and the position. Such changes may, for example, be caused by the interaction between the inclusions and voids among themselves, by natural gravitation, by a movement of the security element 1 or by other internal and/or external influences. In FIG. 6C, this state is evolved, thus, it can be seen in cross-section on the right side that the particles are pulled down. In the case of magnetic particles 12, this may take place for instance via a magnet, which is mounted on the underside of the security element 1.

Figure 7:
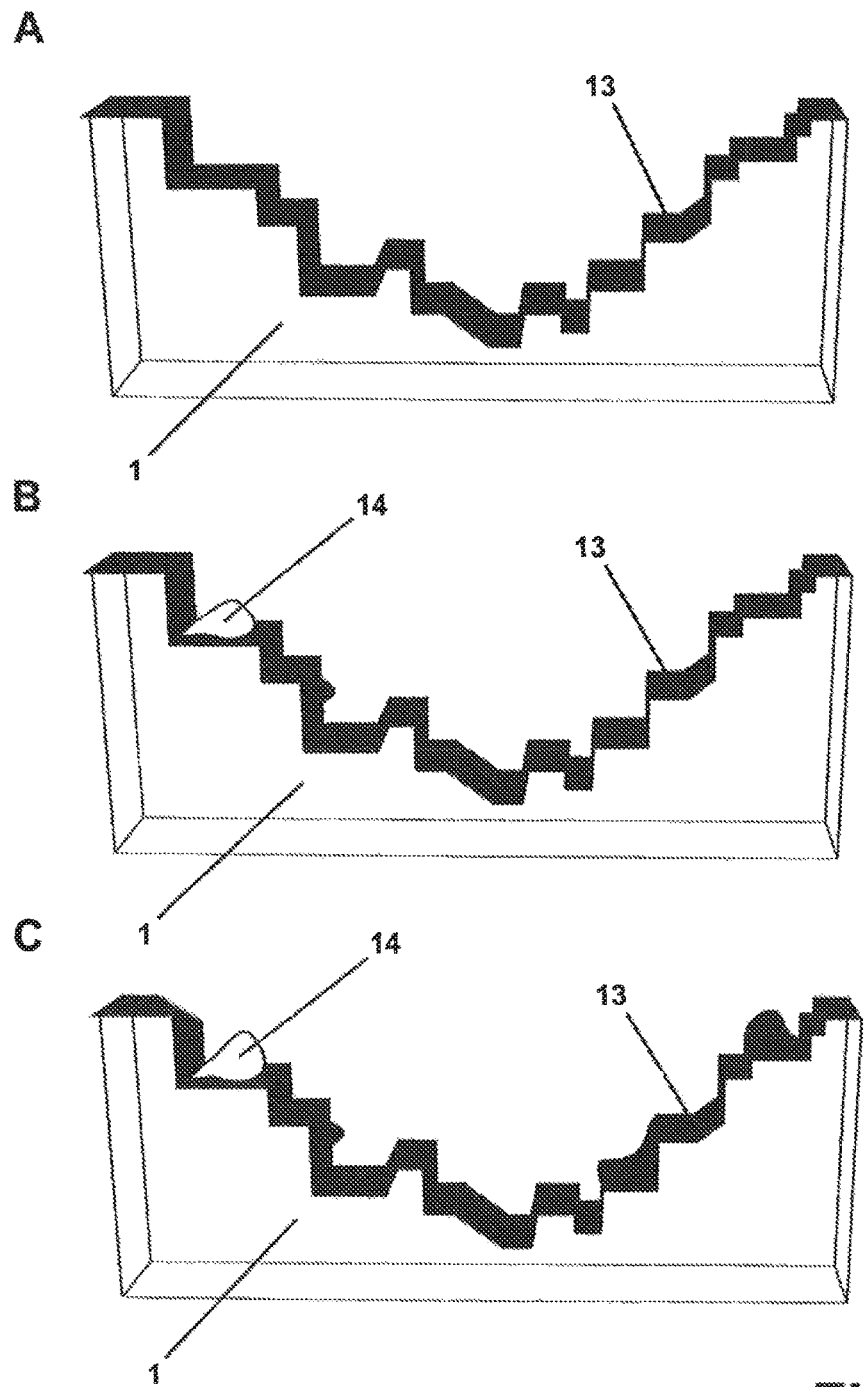

In FIG. 7 a dynamically changeable material is shown. The material shown is characterized by a stair-like structure 13, wherein FIG. 7A represents the initial state. In FIG. 7B the dynamically changed state at a first time point is presented. It can be seen here that additional material 14 is added for some elements of the staircase structure. In FIG. 7C, this material has been further developed, whereby a dynamically variable security element 1 was created.

Figure 8:
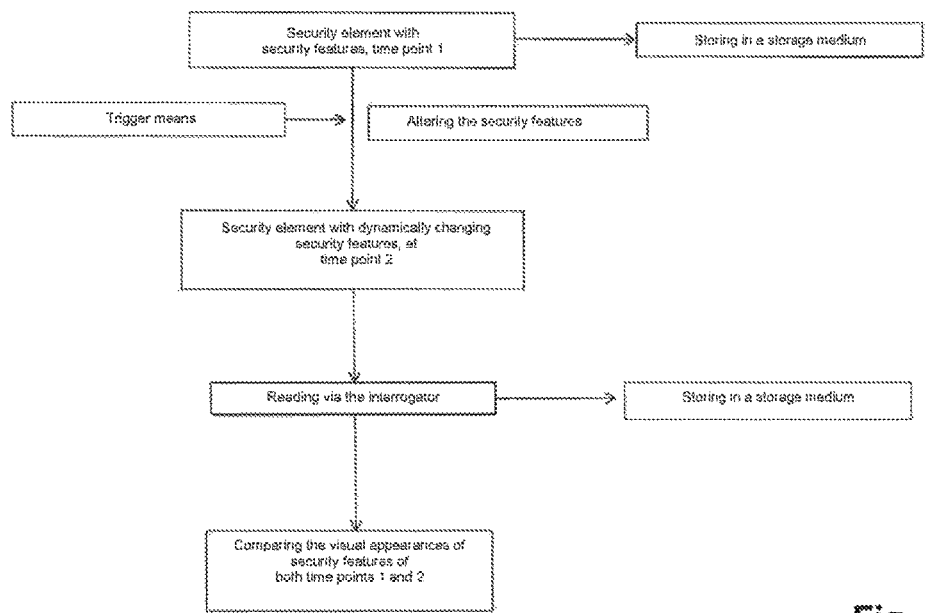

In FIG. 8 the inventive authentication system is presented schematically. First, a security element 1 is provided, which exhibit a variable surface, a structure, a composition or a string. If the security element comprises one or more strings, then the direction of rotation, the location, the position, the colour, the size and other parameters can be selected. The string can comprise symbols, letters, numbers or other characters. The trigger means causes change in these parameters in one or more strings. A scanning means captures, at a time point, the visual appearance of the strings relevant for authentication, and compares it with the string stored most recently in the database.

Generally, the starting point is a security element with individual security features, which have a specific visual appearance at a time point 1. This security element is assigned to a person, a medium or an object and is stored in a storage medium, preferably in digital form. A trigger means which is preferably self-dynamic, changes parts or all security features of the security element. Thus, a security element arises with dynamically changing security features at a time point 2. These security features are read via an interrogator and either stored in a memory device for later retrieval or immediately compared with one another via a data comparison means. If there is a dynamic change of the security features conveyed through the trigger means, then the person, the media or the object is positively authenticated.

The invention claimed is:

1. An authentication system, in which a security element (1) is converted into a dynamic security element (1), comprising
a security element (1) with a changing or a changeable surface (6), a structure, a volume, a composition, or a character string as security features,
a table in a database, which assigns the security element (1) to a person, an object, a medium or a group of these,
a local or a central analog or digital storage medium for storing of a first visual appearance of the security feature,
an optical detection unit to retrieve a second visual appearance of the security feature,
a data comparison software for comparing the retrieved second visual appearance with the first visual appearance of the security feature stored in the local or central storage medium,
a physical or chemical trigger parameter, which causes at least a partial change of a surface (6), a structure, or a property of the security element (1), such that a dynamically modified security element (1) is generated, wherein the second visual appearance of the security feature has changed at least partially compared to the first visual appearance of the security feature and is available for a query by the optical detection unit and is storable in the local or central storage medium, wherein the security element (1) has a partial inner or outer structure, a volume or a material composition, which provides a specific visual appearance for the optical detection unit.

2. The authentication system according to claim 1, wherein the storage medium comprises a service provisioning system, a data, a media, a software, or a string.

3. The authentication system according to claim 1, wherein the security element (1) comprises static, non-variable security features (4) and dynamically variable security features (3), whose profile, structure, composition or visual appearance changes when the trigger parameter reaches a predetermined physical or chemical value.

4. The authentication system according to claim 1, wherein the security element comprises a stretchable material, in which the dynamic security features (3) such as cracks, fissures or recesses are formed, whose diameter or profile can be varied according to the stretch, compression or bending of the material.

5. The authentication system according to claim 1, wherein the security element (1) comprises a first surface with spikes or sharp edges (5), which during movement around a security element (1) formed axis of rotation (7), engage in an adjacent second surface (6) and change their structure.

6. The authentication system according to claim 1, wherein the security element (1) has a first surface (6) provided with static security features (15) integrated therein and a second surface provided with dynamically variable security features (3) integrated therein, and below the first surface (6) of the security element (1) is a rigid base (8) and below the second surface of the security element (1) is a flexible base (8), wherein the flexible base (8) upon activation by the trigger parameter, changes the overlying dynamic security features.

7. The authentication system according to claim 1, wherein the security element (1) has a first surface (6) provided with static security features (15) integrated therein and a second surface provided with dynamically variable security features (3) integrated therein, and the first surface (6) is coated with a protective layer (10) and the second surface (3) is coated with an activation layer (11).

8. The authentication system according to claim 1, wherein the security element (1) comprises a material in which deformable and/or movable voids (16) and/or particulate bodies (12) are located, whose geometric profile, the distance travelled by movement, rotation direction, position and/or visual appearance is/are changeable after activation of the trigger parameter.

9. The authentication system according to claim 1, wherein the security element (1) comprises one or more surface(s) (13) or a volume within a three dimensional structure, which is/are dynamically changeable.

10. The authentication system according to claim 1, wherein the security element (1) comprises an array of several characters, whose position, rotation direction, size, shape and/or colour are changeable by the trigger parameter.

11. The authentication system according to claim 1, wherein the external trigger parameter comprises a measurable physical quantity of an ambient atmosphere, or a behavioural pattern of a person.

12. The authentication system according to claim 11, wherein the trigger parameter itself changes dynamically.

13. The authentication system according to claim 1, wherein a change of the dynamic security features of the security element with a physical parameter as the trigger parameter only occurs if certain conditions are met.

14. The authentication system according to claim 13, wherein the conditions relate to the duration or amplitude of an impulse, which is detected by sensors and transmitted to a corresponding activation device.

15. The authentication system according to claim 1, wherein the trigger parameter is temperature, air pressure, humidity, a colour change of a colour agent, friction or movement.

* * * * *